(12) United States Patent
Lim

(10) Patent No.: US 9,074,564 B2
(45) Date of Patent: Jul. 7, 2015

(54) ADAPTER STRUCTURE FOR MOUNTING BOOST PRESSURE SENSOR ON ELECTRONIC TURBO-CHARGER ENGINE

(75) Inventor: Hyung-Taek Lim, Gyeonggi-Do (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 13/817,857

(22) PCT Filed: Aug. 11, 2011

(86) PCT No.: PCT/KR2011/005869
§ 371 (c)(1),
(2), (4) Date: May 6, 2013

(87) PCT Pub. No.: WO2012/023744
PCT Pub. Date: Feb. 23, 2012

(65) Prior Publication Data
US 2013/0213338 A1 Aug. 22, 2013

(30) Foreign Application Priority Data

Aug. 20, 2010 (KR) .................. 10-2010-0081074

(51) Int. Cl.
*F02M 35/10* (2006.01)
(52) U.S. Cl.
CPC .... *F02M 35/1038* (2013.01); *F02D 2200/0406* (2013.01); *F02M 35/10144* (2013.01); *F02M 35/10157* (2013.01); *Y02T 10/144* (2013.01)
(58) Field of Classification Search
CPC ............ F02M 35/104; F02M 35/1038; F02M 35/10157; F02D 41/0007; F02D 2200/0406; F02D 23/00; F02D 41/0002
USPC ............................ 123/184.24, 184.53, 184.59
See application file for complete search history.

(56) References Cited

U.S. PATENT DOCUMENTS

| 4,131,011 A * | 12/1978 | Ling ............................ 73/29.01 |
| 7,043,993 B2 * | 5/2006 | Hayashi et al. .................. 73/708 |

(Continued)

FOREIGN PATENT DOCUMENTS

| JP | 11-082198 | 3/1999 |
| JP | H11082198 | 3/1999 |

(Continued)

OTHER PUBLICATIONS

Search Report dated Mar. 2, 2012 written in Korean for International Application No. PCT/KR2011/005869, filed Aug. 11, 2011, 3 pages.

(Continued)

*Primary Examiner* — Lindsay Low
*Assistant Examiner* — Long T Tran
(74) *Attorney, Agent, or Firm* — John D. Veldhuis-Kroeze; Westman, Champlin & Koehler, P.A.

(57) ABSTRACT

An adapter structure for mounting a boost pressure sensor according to the present invention, includes: an intake manifold mounting unit which is provided at an intake manifold and is formed with a penetrating hole at one side portion thereof to communicate with an inside of the intake manifold; a pressure sensor adapter which has a lower portion separably coupled to the intake manifold mounting unit, is made of a heat resistant or heat isolating material, and has a channel which is formed at one side portion thereof, transmits intake air pressure from the penetrating hole of the intake manifold mounting unit to the outside, and has an inner space of which a portion far from the penetrating hole of the intake manifold mounting unit is greater than a portion close to the penetrating hole of the intake manifold mounting unit; a boost pressure sensor which is mounted at an upper portion of the pressure sensor adapter so that a pressure detection portion is tightly coupled to an upper end portion of the channel of the pressure sensor adapter, detects the intake air pressure through the channel of the pressure sensor adapter, and sends a generated intake air pressure signal to an electronic control unit of an engine; and a fixing unit which separably fixes the boost pressure sensor to the intake manifold mounting unit by the media of the pressure sensor adapter.

10 Claims, 5 Drawing Sheets

(56) References Cited

U.S. PATENT DOCUMENTS

| | | | |
|---|---|---|---|
| 8,052,780 B2* | 11/2011 | Rotter et al. | 95/273 |
| 8,267,073 B2* | 9/2012 | Kado et al. | 123/572 |
| 2008/0148834 A1* | 6/2008 | Shinjo | 73/116.01 |
| 2008/0163683 A1* | 7/2008 | Becke et al. | 73/431 |
| 2008/0302173 A1* | 12/2008 | Saito et al. | 73/114.33 |
| 2011/0315101 A1* | 12/2011 | Cleary et al. | 123/90.15 |
| 2012/0085324 A1* | 4/2012 | Saito et al. | 123/494 |
| 2012/0198943 A1* | 8/2012 | Saito et al. | 73/861.42 |
| 2013/0036806 A1* | 2/2013 | Kohno | 73/114.33 |

FOREIGN PATENT DOCUMENTS

| | | |
|---|---|---|
| JP | 11-173226 | 6/1999 |
| JP | H1173226 | 6/1999 |
| JP | 11-324833 | 11/1999 |
| JP | 2001-194255 | 7/2001 |
| JP | 2001194255 A | 7/2001 |

OTHER PUBLICATIONS

Chinese Office Action dated Feb. 28, 2015 for corresponding Chinese Application No. 201180048891.2, 7 pages.

* cited by examiner

ADAPTER STRUCTURE FOR MOUNTING BOOST PRESSURE SENSOR ON ELECTRONIC TURBO-CHARGER ENGINE

CROSS-REFERENCE TO RELATED APPLICATION

This Application is a Section 371 National Stage Application of International Application No. PCT/KR2011/005869, filed Aug. 11, 2011 and published, not in English, as WO2012/023744 on Feb. 23, 2012.

FIELD OF THE DISCLOSURE

The present disclosure relates to an adapter structure for mounting a boost pressure sensor on an electronic turbocharger engine, and more particularly, to an adapter structure for mounting a boost pressure sensor on an electronic turbocharger engine, capable of safely protecting the boost pressure sensor for detecting air pressure inside an intake manifold from heat of high temperature air inside the intake manifold, and preventing deterioration in precision of a pressure detection signal generated from the boost pressure sensor during an operation of an engine.

BACKGROUND OF THE DISCLOSURE

In general, when air is supercharged into a combustion chamber of an engine at a pressure higher than the atmospheric pressure, a large amount of air may be charged into the combustion chamber even in the engines having the same air volume displacement, and when a fuel injection amount is increased in this supercharged condition, output power of the engine may be increased. As such, an apparatus of performing a function of supercharging air into the combustion chamber of the engine is referred to as a turbocharger, and an engine for detecting air pressure supplied from the turbocharger to the combustion chamber through the intake manifold and controlling the air pressure, which flows along inside of the intake manifold, within an appropriate range is referred to as an electronic turbocharger engine.

FIG. 1 is a schematic perspective view illustrating a general electronic turbocharger engine including a turbocharger and a boost pressure sensor, and FIG. 2 is a schematic perspective view illustrating a boost pressure sensor mounting structure for protecting a boost pressure sensor from an intake manifold and heat of high temperature air in the intake manifold.

As illustrated in FIGS. 1 and 2, an electronic turbocharger engine 1 includes a turbocharger 2, a boost pressure sensor 3, a gate adjusting apparatus (not illustrated), an electronic control unit (ECU) (not illustrated), and an exhaust gas recirculation (EGR) flow path (not illustrated).

Here, the turbocharger 2 includes a turbine (not illustrated) provided in an exhaust manifold 5 and rotated by a flow of exhaust gas discharged from a combustion chamber, and a compressor 2a provided in an intake manifold 6 and receiving rotational force of the turbine through a rotating shaft (not illustrated) connected to the turbine to suck and compress the external air.

The boost pressure sensor 3 is provided at an outer partial portion of the intake manifold 6, is electrically connected to the electronic control unit, measures boost pressure of intake air which flows along the inside of the intake manifold 6, and generates an intake air pressure detection signal to the electronic control unit.

The gate adjusting apparatus (not illustrated) includes a waste gate (not illustrated) provided at an outlet side of the turbine in the exhaust manifold 5, and an actuator (not illustrated) of which one end portion is mechanically connected to the waste gate and the other end is electrically connected to the electronic control unit.

The exhaust gas recirculation (EGR) flow path (not illustrated) is a gas channel which connects the exhaust manifold 5 and the intake manifold 6, and guides a part of the exhaust gas, which is discharged from the combustion chamber to the outside through the exhaust manifold 5, to the intake manifold 6 without discharging to the atmosphere, thereby improving thermal efficiency of the engine, and reducing the atmosphere discharge amount of harmful exhaust gas.

When the electronic turbocharger engine 1 configured as described above is operated, in a case in which the boost intake air pressure detected by the boost pressure sensor 3 with respect to an engine RPM exceeds a preset reference boost intake air pressure in a high speed/high load section of the engine, the electronic control unit (not illustrated) operates the actuator so that the waste gate of the gate adjusting apparatus moves in a direction in which an opened amount of the outlet of the turbine is decreased, and reduces an RPM of the turbine, and the above operation prevents an excessive rotation of the turbine, thereby preventing damages of the turbocharger 2 and the engine.

However, in the electronic turbocharger engine 1 according to the related art, as illustrated in FIG. 1, the boost pressure sensor 3 is directly mounted on an upper portion of the intake manifold 6 at a high temperature. For this reason, in the electronic turbocharger engine 1, while a heat resistant temperature of the boost pressure sensor 3 is 125° C., an intake air temperature at an ordinary temperature is 144.4° C., and when considering the atmospheric temperature 50° C. in the tropical climate, the intake air temperature is very high in a level of 170° C., and therefore there is a problem in that an operation is impossible because heat damage occurs in the boost pressure sensor 3.

In order to solve the heat damage problem, an electronic turbocharger engine 1a according to the another related art, as illustrated in FIG. 2, the boost pressure sensor 3 is mounted at a fixing portion far from the intake manifold 6 by the media of a mounting bracket 7, and then the boost pressure sensor 3 and the intake manifold 6 are connected by a hose 8 (or pipe).

However, in the hose and mounting bracket connection structure, there is a constraint in terms of a layout in that the boost pressure sensor 3 is necessarily mounted at a fixing point in an upper direction from the intake manifold 6, and the hose 8 forms a wiring route in an upper direction from the intake manifold 6 along the boost pressure sensor 3.

In a process in which the wiring route of the hose is formed, in a case in which a portion where a part of the hose 8 is bent (or bending portion) is generated, condensed water stagnates in the bending portion, and therefore there is a very high concern in that as the hose 8 freezes and bursts in a low temperature condition, the intake air leaks.

In addition, there are problems in that the hose and mounting bracket connection structure requires all the components of a bracket, a hose, a clamp, a bolt, or the like, and an assembly process is complicated, costs are increased because the wiring route of the hose is long, and durability deteriorates.

In addition, the hose and mounting bracket connection structure inevitably has a bending portion, and thus the bending portion reduces the precision of intake air pressure signal. In order to minimize the above problems, the hose and mounting bracket connection structure needs to minimize the number of places of the bending portions and avoid a sharp elbow, but there is a problem in that the bending portion and the sharp elbow are inevitable in terms of a layout configuration.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure has been made in an effort to solve the aforementioned problems, and the object of the present is to provide an adapter structure for mounting a boost pressure sensor on an electronic turbocharger engine, capable of allowing the boost pressure sensor to be conveniently mounted without a constraint in terms of a layout and preventing heat damage to the boost pressure sensor.

Another object of the present disclosure is to provide an adapter structure for mounting a boost pressure sensor on an electronic turbocharger engine, in which heat damage to the boost pressure sensor is prevented, the structure is simple, durability is excellent, and the precision of the intake air pressure signal is high.

To achieve the above object, the present disclosure provides an adapter structure for mounting a boost pressure sensor on an electronic turbocharger engine, including: an intake manifold mounting unit which is provided at an intake manifold and is formed with a penetrating hole at one side portion thereof to communicate with an inside of the intake manifold; a pressure sensor adapter which has a lower portion separably coupled to the intake manifold mounting unit, is made of a heat resistant or heat isolating material, and has a channel which is formed at one side portion thereof, transmits intake air pressure from the penetrating hole of the intake manifold mounting unit to the outside, and has an inner space of which a portion far from the penetrating hole of the intake manifold mounting unit is greater than a portion close to the penetrating hole of the intake manifold mounting unit; a boost pressure sensor which is mounted at an upper portion of the pressure sensor adapter so that a pressure detection portion is tightly coupled to an upper end portion of the channel of the pressure sensor adapter, detects the intake air pressure through the channel of the pressure sensor adapter, and sends a generated intake air pressure signal to an electronic control unit (ECU) of an engine; and a fixing unit which separably fixes the boost pressure sensor to the intake manifold mounting unit by the media of the pressure sensor adapter.

In addition, the present disclosure further provides the following specific exemplary embodiments in addition to the above exemplary embodiment of the present disclosure.

According to an exemplary embodiment of the present disclosure, the lower portion of the channel of the pressure sensor adapter further includes a protruding portion which is provided at the pressure sensor adapter or the intake manifold mounting unit, the protruding portion is extended to a lower and outer side from the channel, and has a guide hole which is formed therein along a length of the protruding portion and communicates with the inside of the intake manifold and the channel, and a seal ring is provided at a connection portion between the pressure sensor adapter and the intake manifold mounting unit so that an airtight state is maintained.

According to an exemplary embodiment of the present disclosure, a total height h of the pressure sensor adapter from a lower end of the pressure sensor adapter to an upper end of the pressure sensor adapter is proportionally increased as an inner diameter w of the guide hole of the protruding portion is increased.

According to an exemplary embodiment of the present disclosure, the h/w is 2 to 5.

According to an exemplary embodiment of the present disclosure, a heat radiation unit is provided on an outer side surface of the pressure sensor adapter to smoothly discharge heat, which is transmitted from the intake manifold to the pressure sensor adapter, to the outside.

According to an exemplary embodiment of the present disclosure, the heat radiation unit includes a plurality of heat radiation fins which forms a lattice pattern along a circumference of the outer side surface of the pressure sensor adapter.

According to an exemplary embodiment of the present disclosure, the channel of the pressure sensor adapter includes an orifice channel of which a lower end portion faces the penetrating hole of the intake manifold mounting unit, and a main channel of which a lower end portion faces the orifice channel, an upper end portion faces the pressure detection portion of the boost pressure sensor, and a volume or an inner diameter is greater than that of the orifice channel.

According to an exemplary embodiment of the present disclosure, the fixing unit includes a penetrating hole provided at the boost pressure sensor, a penetrating hole provided at the pressure sensor adapter to be aligned with the penetrating hole of the boost pressure sensor, a screw hole provided at the intake manifold mounting unit to be aligned with the pressure sensor adapter, and a bolt member including a shaft portion formed with threads to be thread engaged with the screw hole of the intake manifold mounting unit after passing through the penetrating hole of the boost pressure sensor and the penetrating hole of the pressure sensor adapter, and a head portion integrally formed with one end portion of the shaft portion.

According to an exemplary embodiment of the present disclosure, the pressure sensor adapter is made of a heat resistant (or heat isolating) resin of any one of a polyurethane resin, a silicon resin, an epoxy resin, or a polyester resin.

The present disclosure includes a pressure sensor adapter made of a heat resistant (or heat isolating) material and having a channel, and a fixing unit for separably fixing the pressure sensor adapter, thereby enabling the boost pressure sensor to be conveniently mounted at the intake manifold mounting unit by the media of the pressure sensor adapter without a constraint in terms of a layout and preventing heat damage to the boost pressure sensor.

In addition, the present disclosure may fix the pressure sensor adapter to the intake manifold mounting unit by using the fixing unit, and therefore the structure is simple, the assembly is convenient, and durability is excellent.

In addition, unlike the related art, because the present disclosure does not have a bending portion, the structure may be very simple, and precision of the intake air pressure signal may be improved because the present disclosure does not undergo the distortion of the intake air pressure generated at the existing bending portion.

Figure 1:
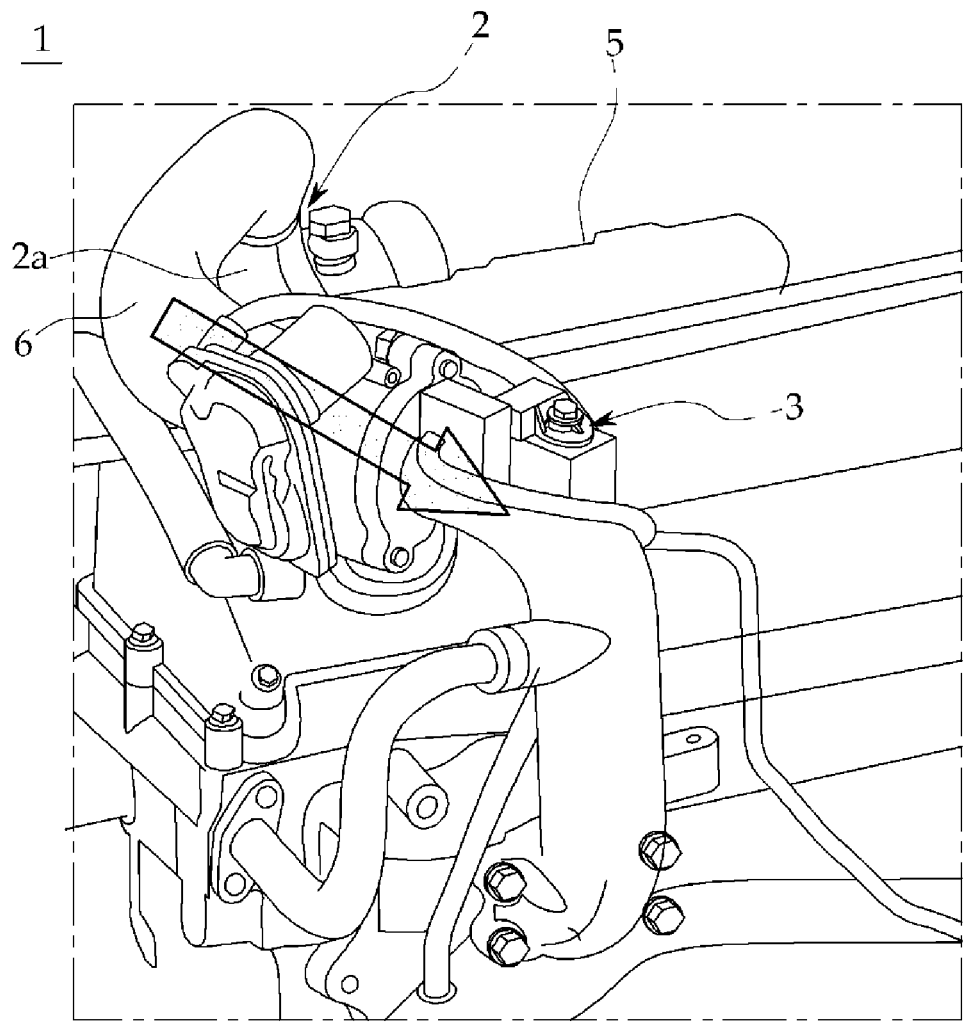
FIG. 1 is a schematic perspective view illustrating a general electronic turbocharger engine including a turbocharger and a boost pressure sensor.
Figure 2:
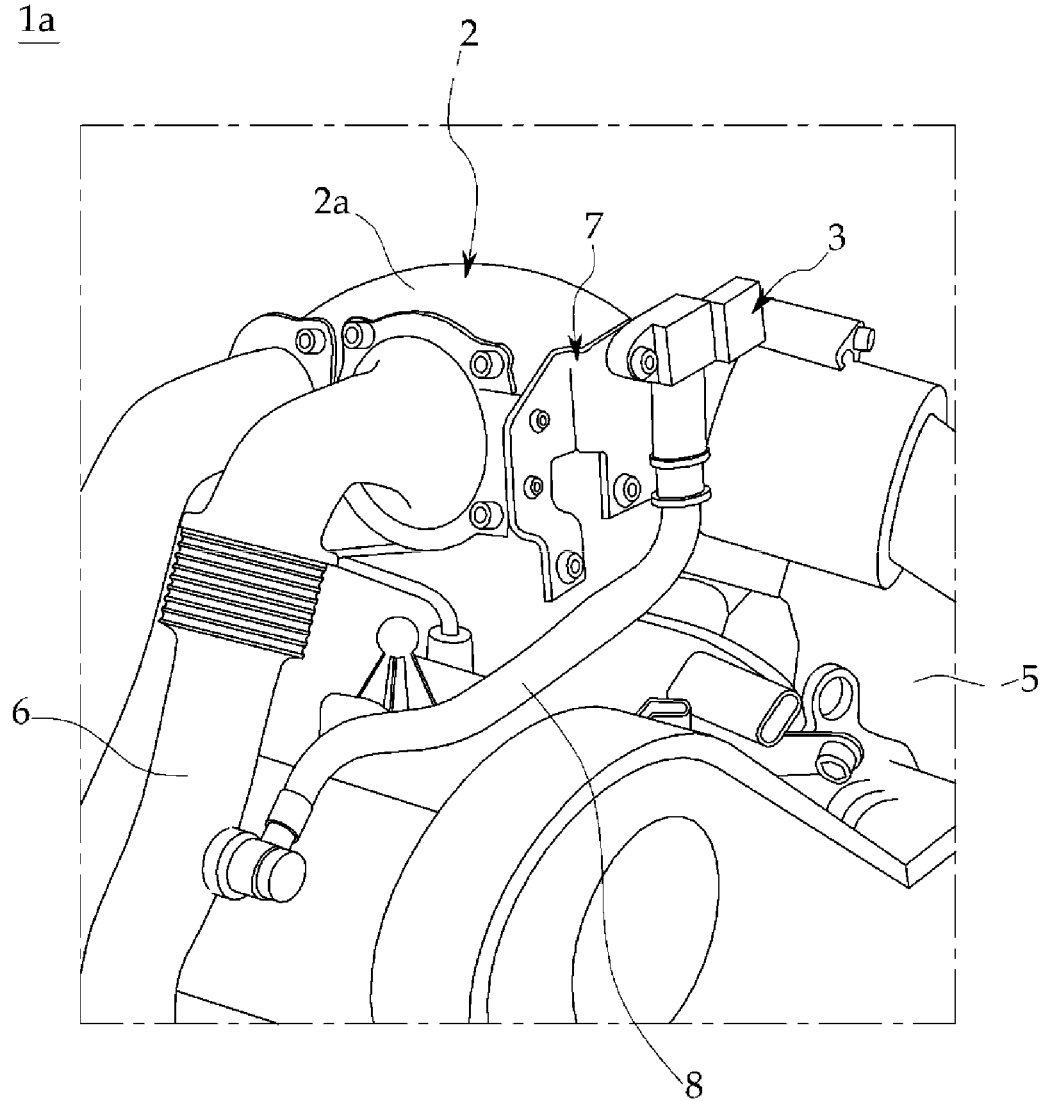
FIG. 2 is a schematic perspective view illustrating a boost pressure sensor mounting structure for protecting a boost pressure sensor from an intake manifold and heat of high temperature air in the intake manifold.

DESCRIPTION OF MAIN REFERENCE
NUMERALS OF DRAWINGS

6: Intake manifold
10: Intake manifold mounting unit
10a, 20a, 30a: Penetrating hole
10b: Screw hole
20: Pressure sensor adapter
21: Channel
21a: Orifice channel
21b: Main channel
22: Protruding portion
22a: Guide hole
23: Heat radiation unit
23a: Heat radiation fin
30: Boost pressure sensor
40: Fixing unit
41: Bolt member
50: Seal ring
h: Total height of pressure sensor adapter
w: Inner diameter of guide hole of protruding portion

DETAILED DESCRIPTION

Hereinafter, an exemplary embodiment of an adapter structure for mounting a boost pressure sensor on an electronic turbocharger engine according to the present disclosure will be described below with reference to FIGS. 3 to 5.

Figure 3:
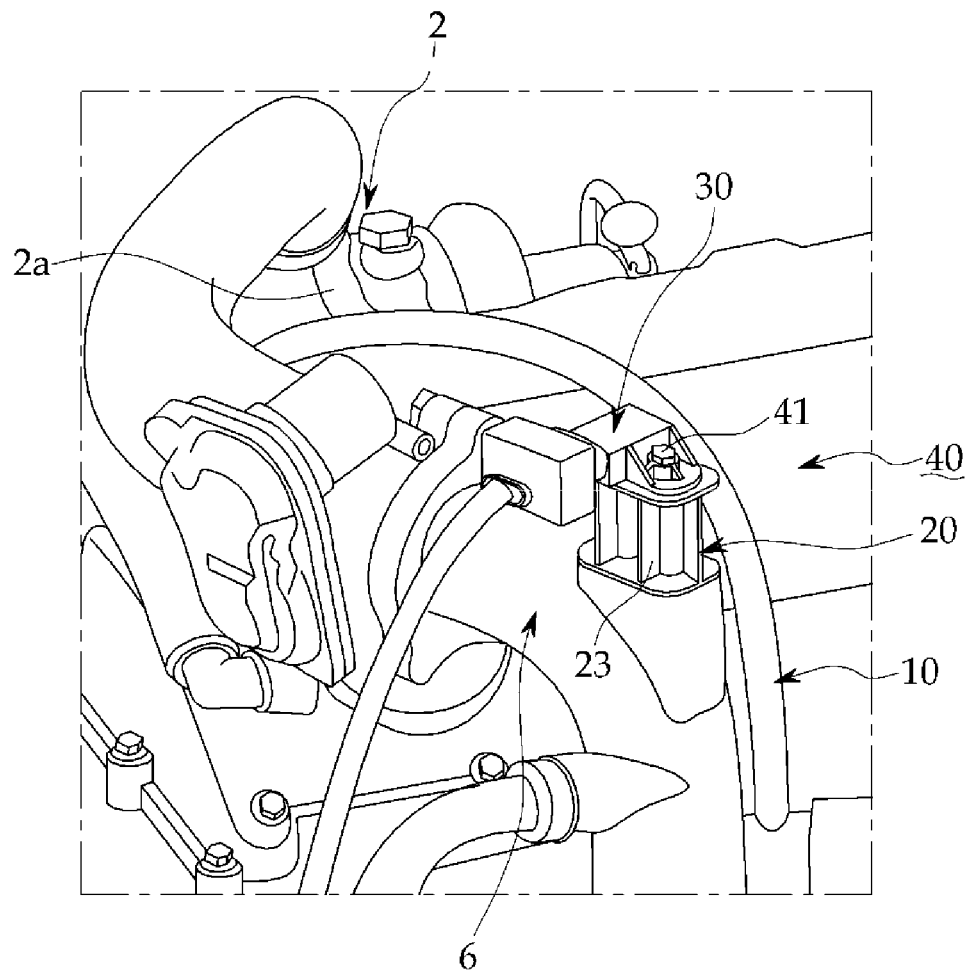
FIG. 3 is a schematic perspective view illustrating an engine to which an adapter structure for mounting a boost pressure sensor on an electronic turbocharger engine according to the present disclosure is applied.
Figure 4:
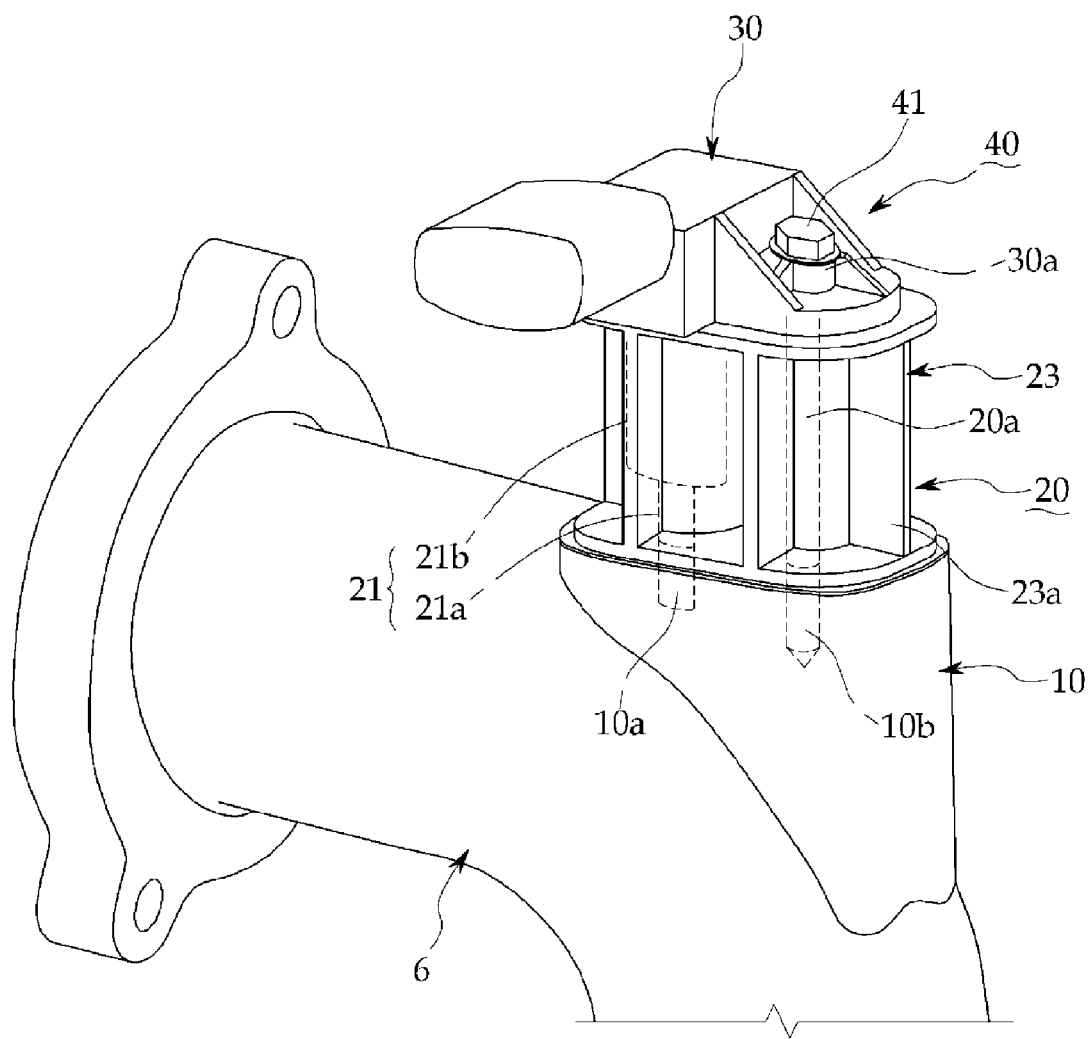
FIG. 4 is a schematic enlarged perspective view illustrating an adapter structure for mounting a boost pressure sensor on an electronic turbocharger engine according to the present disclosure.
Figure 5:
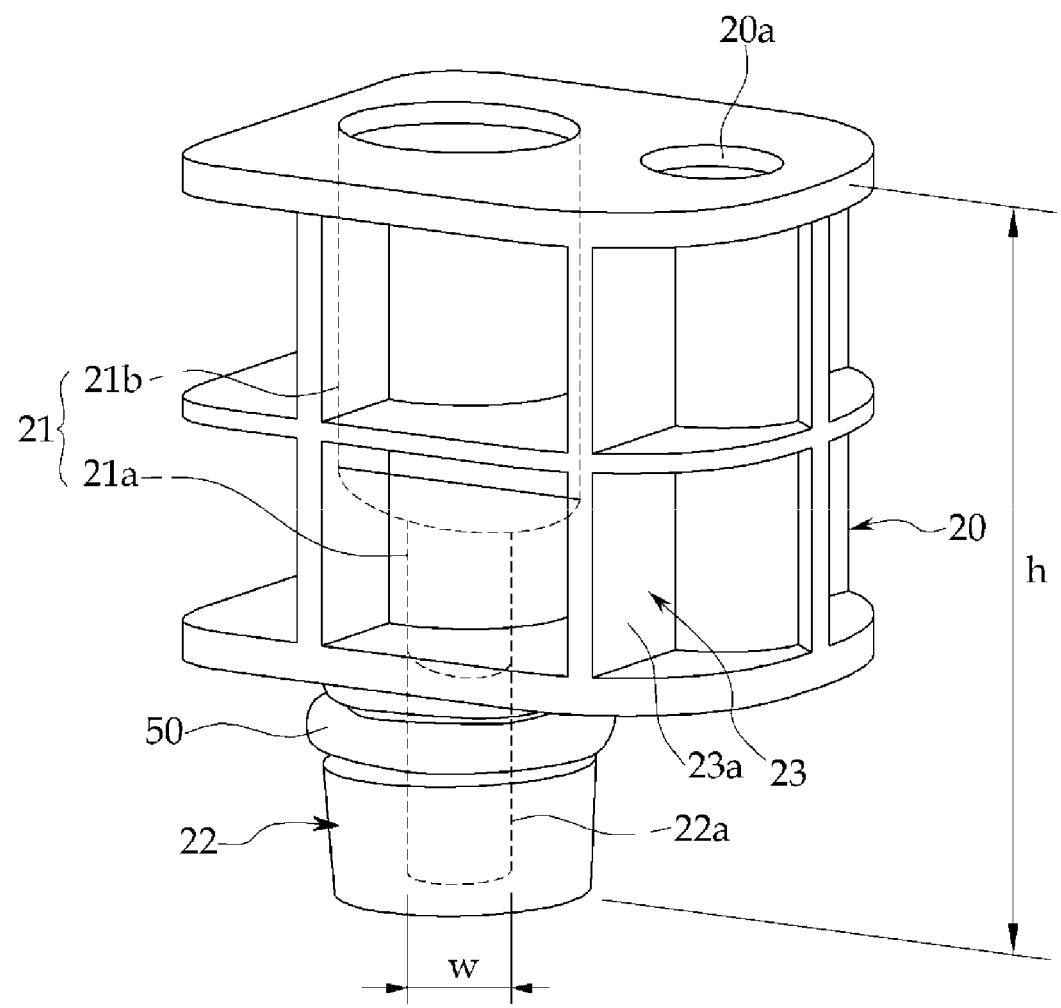
FIG. 5 is a schematic perspective view of a pressure sensor adapter which is applied to an adapter structure for mounting a boost pressure sensor on an electronic turbocharger engine according to the present disclosure.

As illustrated in FIG. 3 to FIG. 5, an adapter structure for mounting a boost pressure sensor on an electronic turbocharger engine according to the present disclosure includes an intake manifold mounting unit 10, a pressure sensor adapter 20, a boost pressure sensor 30, and a fixing unit 40.

Here, the intake manifold mounting unit 10 is provided at an intake manifold 6, and a penetrating hole 10a, which is communicated with the inside of the intake manifold 6, is provided at one side portion of the intake manifold mounting unit 10.

The pressure sensor adapter 20 has a lower portion which is separably coupled to the intake manifold mounting unit 10 and is made of a heat resistant (or heat isolating) material.

In addition, the pressure sensor adapter 20 includes a channel 21 which is provided at one side portion of the pressure sensor adapter 20, transfers intake air pressure from the penetrating hole 10a of the intake manifold mounting unit 10 to the outside, and has an inner space of which a portion far from the penetrating hole 10a of the intake manifold mounting unit 10 is greater than a portion close to the penetrating hole 10a of the intake manifold mounting unit 10.

The boost pressure sensor 30 is mounted at an upper portion of the pressure sensor adapter 20 so that a pressure detection portion is tightly coupled to an upper end portion of the channel 21 of the pressure sensor adapter 20. In addition, the boost pressure sensor 30 detects the intake air pressure through the channel 21 of the pressure sensor adapter 20, and sends a generated intake air pressure signal to an electronic control unit (ECU) (not illustrated) of the engine.

The fixing unit 40 separably fixes the boost pressure sensor 30 to the intake manifold mounting unit 10 by the media of the pressure sensor adapter 20.

In the adapter structure for mounting a boost pressure sensor on an electronic turbocharger engine according to the present disclosure, which is configured as described above, the pressure sensor adapter 20 is made of a heat resistant (or heat isolating) material, and thus heat due to high temperature intake air generated from the intake manifold 6 may be blocked from being transferred to the boost pressure sensor 30 mounted at the upper portion of the pressure sensor adapter 20.

In addition, in the adapter structure for mounting a boost pressure sensor on an electronic turbocharger engine according to the present disclosure, which is configured as described above, because the channel 21, which communicates the penetrating hole 10a of the intake manifold mounting unit 10 and the pressure detection portion of the boost pressure sensor 30, is provided at the pressure sensor adapter 20, precision of the intake air pressure signal transmitted from the inside of the intake manifold 6 to the boost pressure sensor 30 may be improved. That is, because the channel 21 has an inner space of which a portion far from the penetrating hole 10a of the intake manifold mounting unit 10 is greater that a portion close to the penetrating hole 10a of the intake manifold mounting unit 10, the boost pressure sensor 30 may obtain a stable intake air pressure signal through the channel 21.

In addition, in the adapter structure for mounting a boost pressure sensor on an electronic turbocharger engine according to the present disclosure, which is configured as described above, in a state in which the boost pressure sensor 30 is mounted at the intake manifold mounting unit 10 by the media of the pressure sensor adapter 20 without a constraint in terms of a layout, the above components may be conveniently and separably mounted at the intake manifold mounting unit 10 by using the fixing unit 40.

In addition, the adapter structure for mounting a boost pressure sensor on an electronic turbocharger engine according to the present disclosure may be configured in a type, which is more limited to the following specific exemplary embodiments, in addition to the basic configuration as described above.

As an exemplary embodiment, as illustrated in FIG. 5, the lower portion of the channel 21 of the pressure sensor adapter 20 may be provided to further include a protruding portion 22 which is provided at the pressure sensor adapter 20 or the intake manifold mounting unit 10. In this case, the protruding portion 22 is extended to a lower and outer side from the channel 21, and has a guide hole 22a which is formed therein along a length of the protruding portion 22 and communicates with the inside of the intake manifold 6 and the channel 21. In addition, a seal ring 50 may be provided at a connection portion between the pressure sensor adapter 20 and the intake manifold mounting unit 10 so that an airtight state is maintained.

In the protruding portion-seal ring structure of the pressure sensor adapter 20, the protruding portion 22 is fitted into the penetrating hole 10a of the intake manifold mounting unit 10 with a predetermined depth to allow the coupling between the pressure sensor adapter 20 and the intake manifold mounting unit 10 to be stable, and the seal ring 50 is fitted into an outer circumferential portion of the protruding portion 22 to allow a sealing function between the pressure sensor adapter 20 and the intake manifold mounting unit 10 to be reinforced.

As an exemplary embodiment, as illustrated in FIG. 5, a total height h of the pressure sensor adapter 20 from a lower end of the pressure sensor adapter 20 to an upper end of the pressure sensor adapter 20 is proportionally increased as an inner diameter w of the guide hole 22a of the protruding portion 22 is increased. Here, the h/w may be 2 to 5. The reason is that if the h/w is less than 2, a heat damage blocking function of the pressure sensor adapter 20 is very low, and if the h/w is greater than 5, the pressure sensor adapter 20 generates distortion of intake air pressure.

Regarding a ratio of the total height h of the pressure sensor adapter 20 to the inner diameter w of the guide hole 22a of the protruding portion 22, in order to decrease a heat load applied to the pressure sensor adapter 20, the total height h of the pressure sensor adapter 20 may be appropriately increased with respect to the inner diameter w of the guide hole 22a of the protruding portion 22 within the aforementioned range. The reason is that as the inner diameter w of the guide hole 22a of the protruding portion 22 is increased, an amount of the high temperature intake air flows into the channel 21 of the pressure sensor adapter 20 and applies the heat load to the pressure sensor adapter 20.

When considering a heat transfer amount of the pressure sensor adapter 20 and an effective range of the h/w, the height h of the pressure sensor adapter 20 for each intake air temperature, which is required at a minimum, to secure the heat resistant property (or heat isolating property) of the boost pressure sensor 30, may be determined as the following Table 1.

TABLE 1

| Intake Air Temperature (° C.) | Height of Pressure Sensor Adapter (mm) |
|---|---|
| to 160 | 20 to 80 |
| 160 to 180 | 40 to 100 |
| 180 to 200 | 60 to 120 |
| 200 to 220 | 80 to 140 |

As an exemplary embodiment, as illustrated in FIGS. 4 and 5, a heat radiation unit 23 may be provided on an outer side surface of the pressure sensor adapter 20 to smoothly discharge heat, which is transmitted from the intake manifold 6 to the pressure sensor adapter 20, to the outside. Here, the heat radiation unit 23 may be formed in a type including a plurality of heat radiation fins 23a which forms a lattice pattern along a circumference of the outer side surface of the pressure sensor adapter 20.

As an exemplary embodiment, as illustrated in FIGS. 4 and 5, the channel 21 of the pressure sensor adapter 20 includes an orifice channel 21a of which a lower end portion faces the penetrating hole 10a of the intake manifold mounting unit 10, and a main channel 21b of which a lower end portion faces the orifice channel 21a, an upper end portion faces the pressure detection portion of the boost pressure sensor 30, and a volume or an inner diameter is greater than that of the orifice channel 21a.

This channel structure enables the intake air pressure to be checked through the orifice channel 21a and the main channel 21b, and minimizes convection phenomenon due to a vortex, thereby enabling the intake air temperature, which is transmitted from the intake manifold mounting unit 10 to the boost pressure sensor 30, to be low. Consequently, the structure enables the precision of the intake air pressure signal, which is transmitted from the inside of the intake manifold 6 to the boost pressure sensor 30, to be high, and enables the boost pressure sensor 30 to be protected from heat damage.

As an exemplary embodiment, as illustrated in FIG. 4, the fixing unit 40 includes a penetrating hole 30a provided at the boost pressure sensor 30, a penetrating hole 20a provided at the pressure sensor adapter 20 to be aligned with the penetrating hole 30a of the boost pressure sensor 30, a screw hole 10b provided at the intake manifold mounting unit 10 to be aligned with the pressure sensor adapter 20, and a bolt member 41 including a shaft portion formed with threads to be thread engaged with the screw hole 10b of the intake manifold mounting unit 10 after passing through the penetrating hole 30a of the boost pressure sensor 30 and the penetrating hole 20a of the pressure sensor adapter 20, and a head portion integrally formed with one end portion of the shaft portion. Meanwhile, a washer (not illustrated) may be fitted with the shaft portion of the bolt member 41 between the head portion of the bolt member 41 and the penetrating hole 30a of the boost pressure sensor 30 in order to prevent fastening force of the bolt member 41 from being weakened due to vibration or fluctuation of the engine.

As an exemplary embodiment, the pressure sensor adapter 20 is made of a heat resistant (or heat isolating) resin of any one of a polyurethane resin, a silicon resin, an epoxy resin, or a polyester resin. Meanwhile, the pressure sensor adapter 20 may also be made of a material other than the resin as long as the material exhibits a heat resistant (or heat isolating) function to an extent equal to or greater than that of the heat resistant (or heat isolating) resin.

An assembly and an operation of an exemplary embodiment of the adapter structure for mounting a boost pressure sensor on an electronic turbocharger engine according to the present disclosure, which is configured as described above, will be described below with reference to FIGS. 3 to 5.

First, in a state in which the seal ring 50 is fitted to the outer circumferential portion of the protruding portion 22 of the pressure sensor adapter 20, the pressure sensor adapter 20 is positioned at the intake manifold mounting unit 10 so that the guide hole 22a of the protruding portion 22 of the pressure sensor adapter 20 and the penetrating hole 20a are aligned with the penetrating hole 10a and the screw hole 10b of the intake manifold mounting unit 10, respectively.

Next, in a state in which the protruding portion 22 of the pressure sensor adapter 20 is inserted into the penetrating hole 10a of the intake manifold mounting unit 10, the boost pressure sensor 30 is positioned at the upper portion of the pressure sensor adapter 20 so that the pressure detection portion of the boost pressure sensor 30 may be tightly coupled to the main channel 21b of the channel 21 of the pressure sensor adapter 20.

Next, the shaft portion of the bolt member 41 is sequentially fitted to the penetrating hole 30a of the boost pressure sensor 30 and the penetrating hole 20a of the pressure sensor adapter 20, and is thread fastened to the screw hole 10b of the intake manifold mounting unit 10.

An operation of the adapter structure for mounting a boost pressure sensor on an electronic turbocharger engine according to the present disclosure, which is completely assembled as described above, will be described below.

When the engine is operated, a compressor 2a is rotated by a turbine (not illustrated) of the turbocharger 2 that is operated by discharge pressure of the exhaust gas, and external air is sucked by the compressor 2a and flows into the combustion chamber through the intake manifold 6.

At this time, a part of intake air immediately before flowing from the intake manifold 6 into the combustion chamber flows into the channel 21 of the pressure sensor adapter 20 through the guide hole 22a of the protruding portion 22 of the pressure sensor adapter 20 mounted at the intake manifold mounting unit 10 of the intake manifold 6.

As such, when the intake air flows in through the orifice channel 21a and the main channel 21b of the channel 21, the boost pressure sensor 30 mounted at the upper portion of the pressure sensor adapter 20 detects the intake air pressure inside the main channel 21b of the pressure sensor adapter 20, an intake air pressure signal, which is generated by the detection, is sent to the electronic control unit (ECU) of the engine, and therefore the electronic control unit performs a preset control operation.

At this time, because the pressure sensor adapter 20 may block all of the heat transfers by all of three types of heat transfer, that is, conduction, radiation, and convection, the boost pressure sensor 30 mounted at the upper portion of the pressure sensor adapter 20 is not heated by a high temperature, thereby being safely protected from the heat damage.

Here, the heat transfer by the conduction does not occur because the pressure sensor adapter 20 is made of a heat resistant (or heat isolating) material, the heat transfer by the radiation does not reach the boost pressure sensor 30 because a temperature of the pressure sensor adapter 20 is low, and the heat transfer by the convection is almost blocked except for a small amount of convection heat transfer due to a vortex or the like because the flow of the intake air is not generated inside the channel 21 of the pressure sensor adapter 20.

As a result of measuring the temperatures of the boost pressure sensor 30 in the same condition before and after applying the adapter structure for mounting a boost pressure sensor on an electronic turbocharger engine according to the present disclosure, which is operated as described above, the temperature is decreased by 67.9° C. from 144.4° C. before the adapter structure is applied to the boost pressure sensor 30 to 76.5° C. after the adapter structure is applied. Regarding this value, because the intake air temperature is at a level of 101.5° C. even when considering the atmospheric temperature of 50° C. corresponding to the tropical climate, which is equal to or less than the heat resistant temperature of 125° C. of the boost pressure sensor 30, the heat damage problem does not occur.

The present disclosure described above is not limited to the aforementioned exemplary embodiments and the accompanying drawings, and it is apparent to those skilled in the art that simple replacements, alterations and changes may be made thereto within the technical spirit of the present disclosure.

The present disclosure includes a pressure sensor adapter made of a heat resistant (or heat isolating) material and having a channel, and a fixing unit for separably fixing the pressure sensor adapter, thereby enabling the boost pressure sensor to be conveniently mounted at the intake manifold mounting unit by the media of the pressure sensor adapter without a constraint in terms of a layout and preventing heat damage to the boost pressure sensor.

In addition, the present disclosure may fix the pressure sensor adapter to the intake manifold mounting unit by using the fixing unit, and therefore the structure is simple, the assembly is convenient, and durability is excellent.

In addition, unlike the related art, because the present disclosure does not have a bending portion, the structure is very simple, and precision of the intake air pressure signal may be improved because the present disclosure does not undergo the distortion of the intake air pressure generated at the existing bending portion.

Although the present disclosure has been described with reference to exemplary and preferred embodiments, workers skilled in the art will recognize that changes may be made in form and detail without departing from the spirit and scope of the disclosure.

The invention claimed is:

1. An adapter structure for mounting a boost pressure sensor on an electronic turbocharger engine, comprising:
    an intake manifold mounting unit which is provided at an intake manifold and is formed with a penetrating hole at one side portion thereof to communicate with an inside of the intake manifold;
    a pressure sensor adapter which has a lower portion separably coupled to the intake manifold mounting unit, is made of a heat resistant or heat isolating material, and has a channel which is formed at one side portion thereof, transmits intake air pressure from the penetrating hole of the intake manifold mounting unit to the outside, and has an inner space of which a portion far from the penetrating hole of the intake manifold mounting unit is greater than a portion close to the penetrating hole of the intake manifold mounting unit;
    a boost pressure sensor which is mounted at an upper portion of the pressure sensor adapter so that a pressure detection portion is tightly coupled to an upper end portion of the channel of the pressure sensor adapter, detects the intake air pressure through the channel of the pressure sensor adapter, and sends a generated intake air pressure signal to an electronic control unit (ECU) of an engine; and
    a fixing unit which separably fixes the boost pressure sensor to the intake manifold mounting unit by the media of the pressure sensor adapter; and
    a heat radiation unit provided on an outer side surface of the pressure sensor adapter to smoothly discharge heat, which is transmitted from the intake manifold to the pressure sensor adapter, to the outside, wherein the heat radiation unit includes at least one heat radiation fin.

2. The adapter structure of claim 1, wherein the lower portion of the channel of the pressure sensor adapter further includes a protruding portion which is provided at the pressure sensor adapter or the intake manifold mounting unit, the protruding portion is extended to a lower and outer side from the channel, and has a guide hole which is formed therein along a length of the protruding portion and communicates with the inside of the intake manifold and the channel, and a seal ring is provided at a connection portion between the pressure sensor adapter and the intake manifold mounting unit so that an airtight state is maintained.

3. The adapter structure of claim 2, wherein a total height h of the pressure sensor adapter from a lower end of the pressure sensor adapter to an upper end of the pressure sensor adapter is proportionally increased as an inner diameter w of the guide hole of the protruding portion is increased.

4. The adapter structure of claim 3, wherein a ratio of the total height h to the inner diameter w of the guide hole of the protruding portion is 2 to 5.

5. The adapter structure of claim 1, wherein the channel of the pressure sensor adapter includes an orifice channel of which a lower end portion faces the penetrating hole of the intake manifold mounting unit, and a main channel of which a lower end portion faces the orifice channel, an upper end portion faces the pressure detection portion of the boost pressure sensor, and a volume or an inner diameter is greater than that of the orifice channel.

6. The adapter structure of claim 1, wherein the fixing unit includes a penetrating hole provided at the boost pressure sensor, a penetrating hole provided at the pressure sensor adapter to be aligned with the penetrating hole of the boost pressure sensor, a screw hole provided at the intake manifold mounting unit to be aligned with the pressure sensor adapter, and a bolt member including a shaft portion formed with threads to be thread engaged with the screw hole of the intake manifold mounting unit after passing through the penetrating hole of the boost pressure sensor and the penetrating hole of the pressure sensor adapter, and a head portion integrally formed with one end portion of the shaft portion.

7. The adapter structure of claim 1, wherein the pressure sensor adapter is made of a heat resistant (or heat isolating) resin of any one of a polyurethane resin, a silicon resin, an epoxy resin, or a polyester resin.

8. The adapter structure of claim 2, wherein the channel of the pressure sensor adapter includes an orifice channel of which a lower end portion faces the penetrating hole of the intake manifold mounting unit, and a main channel of which a lower end portion faces the orifice channel, an upper end portion faces the pressure detection portion of the boost pressure sensor, and a volume or an inner diameter is greater than that of the orifice channel.

9. An adapter structure for mounting a boost pressure sensor on an electronic turbocharger engine, comprising:
   an intake manifold mounting unit which is provided at an intake manifold and is formed with a penetrating hole at one side portion thereof;
   a pressure sensor adapter which has a lower portion separably coupled to the intake manifold mounting unit, is made of a heat resistant or heat isolating material, and has a channel which is formed at one side portion thereof, transmits intake air pressure from the penetrating hole of the intake manifold mounting unit to the outside, and has an inner space of which a portion comparatively farther from the penetrating hole of the intake manifold mounting unit is greater than a portion comparatively closer to the penetrating hole of the intake manifold mounting unit;
   a boost pressure sensor which is mounted at an upper portion of the pressure sensor adapter so that a pressure detection portion is tightly coupled to an upper end portion of the channel of the pressure sensor adapter, detects the intake air pressure through the channel of the pressure sensor adapter, and sends a generated intake air pressure signal to an electronic control unit (ECU) of an engine; and
   a fixing unit which separably fixes the boost pressure sensor to the intake manifold mounting unit by the media of the pressure sensor adapter; and
   a heat radiation unit provided on an outer side surface of the pressure sensor adapter to smoothly discharge heat, which is transmitted from the intake manifold to the pressure sensor adapter, to the outside, wherein the heat radiation unit includes a plurality of heat radiation fins which forms a lattice pattern along a circumference of the outer side surface of the pressure sensor adapter.

10. An adapter structure for mounting a boost pressure sensor on an electronic turbocharger engine, comprising:
    an intake manifold mounting unit which is provided at an intake manifold and is formed with a penetrating hole at one side portion thereof to communicate with an inside of the intake manifold;
    a pressure sensor adapter which has a lower portion separably coupled to the intake manifold mounting unit, is made of a heat resistant or heat isolating material, and has a channel which is formed at one side portion thereof, transmits intake air pressure from the penetrating hole of the intake manifold mounting unit to the outside, and has an inner space of which a portion far from the penetrating hole of the intake manifold mounting unit is greater than a portion close to the penetrating hole of the intake manifold mounting unit;
    a boost pressure sensor which is mounted at an upper portion of the pressure sensor adapter so that a pressure detection portion is tightly coupled to an upper end portion of the channel of the pressure sensor adapter, detects the intake air pressure through the channel of the pressure sensor adapter, and sends a generated intake air pressure signal to an electronic control unit (ECU) of an engine; and
    a fixing unit which separably fixes the boost pressure sensor to the intake manifold mounting unit by the media of the pressure sensor adapter; and
    wherein the fixing unit includes a penetrating hole provided at the boost pressure sensor, a penetrating hole provided at the pressure sensor adapter to be aligned with the penetrating hole of the boost pressure sensor, a screw hole provided at the intake manifold mounting unit to be aligned with the pressure sensor adapter, and a bolt member including a shaft portion formed with threads to be thread engaged with the screw hole of the intake manifold mounting unit after passing through the penetrating hole of the boost pressure sensor and the penetrating hole of the pressure sensor adapter, and a head portion integrally formed with one end portion of the shaft portion.

* * * * *